United States Patent
Hernacki et al.

(10) Patent No.: US 7,808,958 B1
(45) Date of Patent: Oct. 5, 2010

(54) ROGUE WIRELESS ACCESS POINT DETECTION

(75) Inventors: Brian Hernacki, San Carlos, CA (US); Sourabh Satish, Fremont, CA (US)

(73) Assignee: Symantec Corporation, Cupertino, CA (US)

( * ) Notice: Subject to any disclaimer, the term of this patent is extended or adjusted under 35 U.S.C. 154(b) by 550 days.

(21) Appl. No.: 11/536,206

(22) Filed: Sep. 28, 2006

(51) Int. Cl.
  *H04W 4/00* (2009.01)
(52) U.S. Cl. ............ 370/338; 370/229; 370/252; 370/329; 370/352; 370/395.1
(58) Field of Classification Search ........... 370/229, 370/252, 329, 352, 395.1
See application file for complete search history.

(56) References Cited

U.S. PATENT DOCUMENTS

| | | | |
|---|---|---|---|
| 7,257,107 B2* | 8/2007 | Swier et al. ............ 370/338 |
| 7,336,670 B1* | 2/2008 | Calhoun et al. ........... 370/401 |
| 7,417,548 B2* | 8/2008 | Kavounas et al. ........ 340/572.2 |
| 2006/0193258 A1* | 8/2006 | Ballai ................... 370/230 |
| 2007/0025245 A1* | 2/2007 | Porras et al. ............. 370/229 |
| 2007/0025334 A1* | 2/2007 | Meyer .................. 370/352 |
| 2007/0058598 A1* | 3/2007 | Ling .................... 370/338 |
| 2008/0052779 A1* | 2/2008 | Sinha et al. ............... 726/22 |

* cited by examiner

*Primary Examiner*—Vincent P Harper
*Assistant Examiner*—Khalid Shaheed
(74) *Attorney, Agent, or Firm*—Fenwick & West LLP

(57) ABSTRACT

A local computing endpoint (e.g., a desktop computer, a notebook computer) is used to detect the presence of and record information about one or more wireless access point within range of the local computing endpoint. The recorded information is processed by a centralized computing endpoint to determine whether any of the one or more wireless access points is a rogue wireless access point.

24 Claims, 4 Drawing Sheets

ROGUE WIRELESS ACCESS POINT DETECTION

BACKGROUND

FIG. 1 shows a typical organizational computing environment 100. In the organization (e.g., a company, a school, a government office), there are numerous local computing endpoints (e.g., desktop computers, notebook/laptop computers) 102-136. These local computing endpoints 102-136 are generally connected to a network of the organization at those points where a wired connection (e.g., a "network drop") is available. The organization may also or alternatively provide a wireless communication infrastructure so as to allow the local computing endpoints 102-136 to wirelessly connect to the network.

The wireless communication infrastructure is built through the deployment of wireless access points (WAPs) (such organization-deployed wireless access points not shown in FIG. 1). In general, a "wireless access point" is a device to which another device (e.g., a desktop computer, a notebook/laptop computer) can wirelessly connect to access a network such as a local area network (LAN) (e.g., a network owned and managed by the organization) and/or a wide area network (WAN) (e.g., the Internet). Such communication facilitated by wireless access points allows individuals to be mobile with their respective computing devices. In other words, the individual is not limited to connecting their computing device to a network at only those points where a wired connection is available.

Given the wide availability and low cost of wireless access points, it is easy for individuals to deploy their own wireless access points within the organization. If an organization does not provide wireless access at a particular location, an individual may deploy his/her own wireless access point within range of that particular location and connect it to the organization's network. In such a manner, the individual can then wirelessly connect to the network at the previously unconnected location. Such wireless access points are referred to herein as "rogue" as they are not "sanctioned," i.e., owned and/or managed, by the organization. In other words, while wireless access points deployed by the organization are configured in accordance with the organization's security policies, rogue wireless access points brought and deployed by individuals may not meet the organization's security requirements, thereby opening a potentially dangerous "back door" into the organization's network.

Referring again to FIG. 1, various rogue wireless access points 146, 148, 150, 152 are shown as being deployed throughout the organization. Organizations are known to take one or more of various measures to prevent security breaches resulting from network access through rogue wireless access points. For example, some organizations have policies to altogether forbid the deployment of unsanctioned wireless access points.

Another approach to prevent an organization's network from being compromised via rogue wireless access points involves jamming frequencies typically used by wireless access points. However, such jamming is counterproductive if the organization has deployed its own "sanctioned" wireless access points. Moreover, in some locales, frequency jamming is illegal.

In some cases, organizations dispatch personnel to manually inspect locations (e.g., offices) for the presence of rogue wireless access points. However, this approach is cumbersome in that it has to be constantly performed. Further, especially for large organizations, this approach necessarily requires increased amounts of time and manpower.

Referring again to FIG. 1, some organizations deploy physical sensors 138, 140, 142, 144 to detect wireless network activity. In such a manner, the physical sensors 138, 140, 142, 144 can be used to detect unauthorized wireless communications. However, this approach requires the deployment of a large number of physical sensors, a number which commensurately increases as the organization grows in total space and number of locations.

SUMMARY

According to at least one aspect of one or more embodiments of the present invention, a computer-implemented method of detecting a security threat in an organization includes activating a wireless interface of a local computing endpoint. The method further includes detecting a wireless access point with the wireless interface. In response to a positive detection, the method includes recording information about the wireless access point. The method additionally includes providing the recorded information to at least one computing module adapted to determine, based on the recorded information, whether the wireless access point is a rogue wireless access point.

According to at least one other aspect of one or more embodiments of the present invention, a computer-implemented method of detecting a security threat in an organization includes collecting information from a plurality of local computing endpoints, where the collected information includes fingerprint data of wireless access points detected and monitored by the local computing endpoints. The method also includes determining a possible location of at least one of the wireless access points based on the collected information. The method further includes determining whether the at least one wireless access point exhibits a characteristic of a wireless access point sanctioned by the organization. In response to determining the possible location of the at least one wireless access point and/or determining whether the at least one wireless access point exhibits the characteristic, the method includes reporting the at least one wireless access point as being a rogue wireless access point.

According to at least one other aspect of one or more embodiments of the present invention, a system for detecting a security threat in an organization includes a local computing endpoint having a wireless interface, where the wireless interface is enabled to detect a wireless access point and record information about the wireless access point. The system further includes a centralized computing endpoint operatively connected to the local computing endpoint, where the centralized computing endpoint is arranged to determine whether the wireless access point is a rogue wireless access point based at least in part on the information collected at the local computing endpoint.

According to at least one other aspect of one or more embodiments of the present invention, a computer-readable medium has instructions stored therein that are executable by a processor to: at least for some period of time, cause a local computing endpoint to continuously detect for presence of a wireless access point; in response to a positive detection, record information about the wireless access point; and upon connection to a centralized computing endpoint, transmit the recorded information to the centralized computing endpoint, where the recorded information is usable by the centralized computing endpoint to determine whether the wireless access point is a rogue wireless access point.

According to at least one other aspect of one or more embodiments of the present invention, a computer-readable medium has instructions stored therein that are executable by a processor to: collect information from a local computing endpoint, the information comprising data about a wireless access point detected by the local computing endpoint; determine a possible location of the wireless access point using the collected information; determine, using the collected information, whether the wireless access point exhibits a characteristic of a wireless access point type sanctioned by the organization; and determine whether the wireless access point is a rogue wireless access point responsive to at least one of the determination of the possible location and the determination of whether the wireless access point exhibits the characteristic.

The features and advantages described herein are not all inclusive, and, in particular, many additional features and advantages will be apparent to those skilled in the art in view of the following description. Moreover, it should be noted that the language used herein has been principally selected for readability and instructional purposes and may not have been selected to circumscribe the present invention.

Each of the figures referenced above depict an embodiment of the present invention for purposes of illustration only. Those skilled in the art will readily recognize from the following description that one or more other embodiments of the structures, methods, and systems illustrated herein may be used without departing from the principles of the present invention.

DETAILED DESCRIPTION

In the following description of embodiments of the present invention, numerous specific details are set forth in order to provide a more thorough understanding of the present invention. However, it will be apparent to one skilled in the art that the present invention may be practiced without one or more of these specific details. In other instances, well-known features have not been described in detail to avoid unnecessarily complicating the description.

In general, embodiments of the present invention relate to an approach for rogue wireless access point detection. More particularly, in one or more embodiments, local computing endpoints in an organization are enabled to monitor wireless activity. The wireless activity information collected among the local computing endpoints may then be used to determine which of the wireless access points in the organization are rogue.

Figure 2:
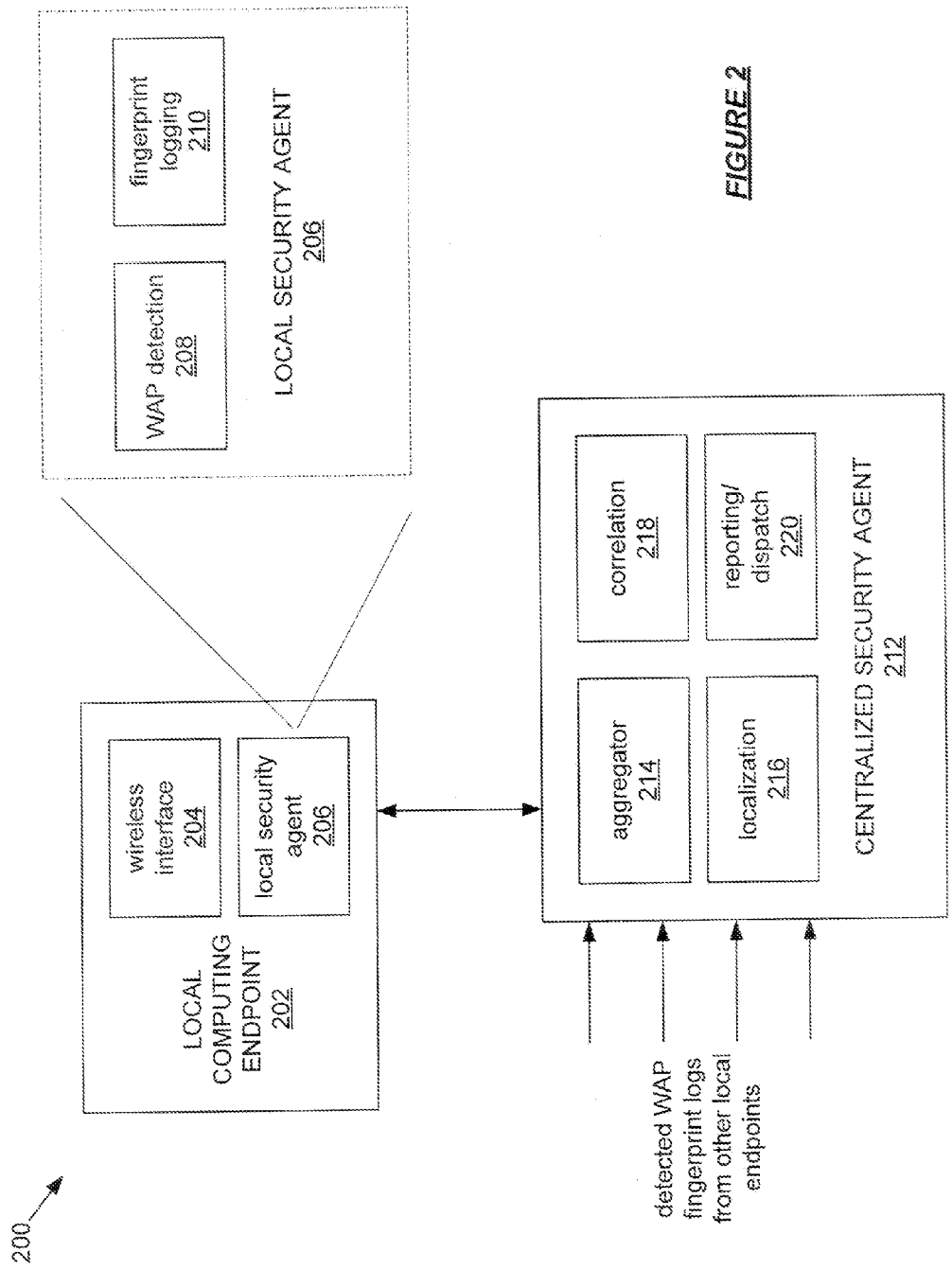
FIG. 2 shows a rogue wireless access point detection system in accordance with an embodiment of the present invention.

FIG. 2 shows a rogue wireless access point detection system 200 in accordance with an embodiment of the present invention. The system 200, being associated with an organization, involves a local computing endpoint 202. The local computing endpoint 202 may be, for example, a desktop or notebook computer. Moreover, in one or more embodiments, the local computing endpoint 202 may be a handheld computer.

The local computing endpoint 202 may be connected to the organization's network via a wired connection. For example, a network cable may be used to connect the local computing endpoint 202 to a physical network drop placed in a wall or floor.

Further, the local computing endpoint 202 has a wireless interface 204. In general, the wireless interface 204 is any hardware and/or software component that enables the local computing endpoint 202 to wirelessly communicate according to a recognized wireless communication standard (e.g., IEEE 802.11b). The wireless interface 204 may be a wireless card or adapter located in the local computing endpoint. Further, for example, the wireless interface 204 may be supported by a processor or chip set (not shown) of the local computing endpoint 202. Further still, the wireless interface 204 may be provided using a wireless dongle (not shown) that can be connected to a port (e.g., a universal serial bus (USB) port) of the local computing endpoint 202. It is noted that instead of or in addition to connecting to the organization's network via a wired connection as described above, the local computing endpoint 202 may connect to the network via its wireless interface 204.

Still referring to FIG. 2, the local computing endpoint 202 has a local security agent 206. The local security agent 206 may be security software (e.g., Norton Antivirus™ by Symantec Corporation, Symantec Client Security by Symantec Corporation) for detecting and remediating malware (e.g., viruses, worms, spyware). In one or more other embodiments, the local security agent 206 may not necessarily have anti-malware functionality, but may rather be configured to specifically perform functions associated with one or more embodiments of the present invention.

As shown in FIG. 2, the local security agent 206 has a plurality of modules, where a "module" is any logic, functionality, and/or program implemented in hardware and/or software. The local security agent 206 has a wireless access point detection module 208. In general, the wireless access point detection module 208 detects the presence of wireless access points. In order to do this, the wireless access point detection module 208 relies on the wireless interface 204 being continuously "on" (but perhaps firewalled). With the wireless interface 204 active, the wireless access point detection module 208 listens for wireless broadcasts at those frequencies known to support wireless communications (e.g., frequencies associated with the IEEE 802.11 wireless network protocol).

Particularly, in one or more embodiments, the wireless access point detection module 208 detects for beacon frames. A wireless access point periodically broadcasts a beacon frame to announce its presence and relay information, such as a timestamp, a service set identifier (SSID), and other parameters regarding the wireless access point. It is noted that a destination media access control (MAC) address specified in the beacon frame is usually set to allow all wirelessly-enabled local computing endpoints within range of the wireless access point to receive and process the beacon frame. Thus, by detecting a beacon frame broadcast by a particular wireless access point, the wireless access point detection module 208 learns of the presence of that wireless access point.

Further, the local security agent 206 includes a fingerprint logging module 210. In general, upon detection of a wireless access point by the wireless access point detection module 208, the fingerprint logging module 210 records particular wireless activity information and effectively builds a profile of that wireless access point. For example, in one or more embodiments, the fingerprint logging module 210 records a signal strength of a detected wireless access point.

Further, for example, the fingerprint logging module 210 may extract information from a beacon frame broadcast by a detected wireless access point. The beacon frame contains a source MAC address, which can be used to identify a make and model of the detected wireless access point. The beacon frame also specifies the data transmission rate of the detected wireless access point.

In one or more embodiments, the wireless interface 204 may directly connect to a detected wireless access point to collect additional information that might otherwise not be broadcasted. For example, the fingerprint logging module 210 may record software, file, and/or hardware details of the detected wireless access point in response to a specific request sent from the wireless interface 204 to the detected wireless access point.

Further, the fingerprint logging module 210 may keep track of anomalous wireless activity. For example, the fingerprint logging module 210 may be provided with functionality to discern normal wireless activity in the organization from abnormal wireless activity (e.g., a continuous demand for large amounts of data, repeated attempts to deliver the same data). Should abnormal wireless activity be detected, the fingerprint logging module 210 may monitor such data request, access, and/or delivery patterns.

In addition to the information collected about a detected wireless access point, the fingerprint logging module 210 may associate an internet protocol (IP) address of the local computing endpoint 202 with the collection of information from the detected wireless access point. For example, if the local computing endpoint 202 is moved from one location in the organization to another, the IP address of the local computing endpoint 202 may change, and thus it may be important to keep track of the location of the local computing endpoint 202 as it collects information about detected wireless access points.

Figure 1:
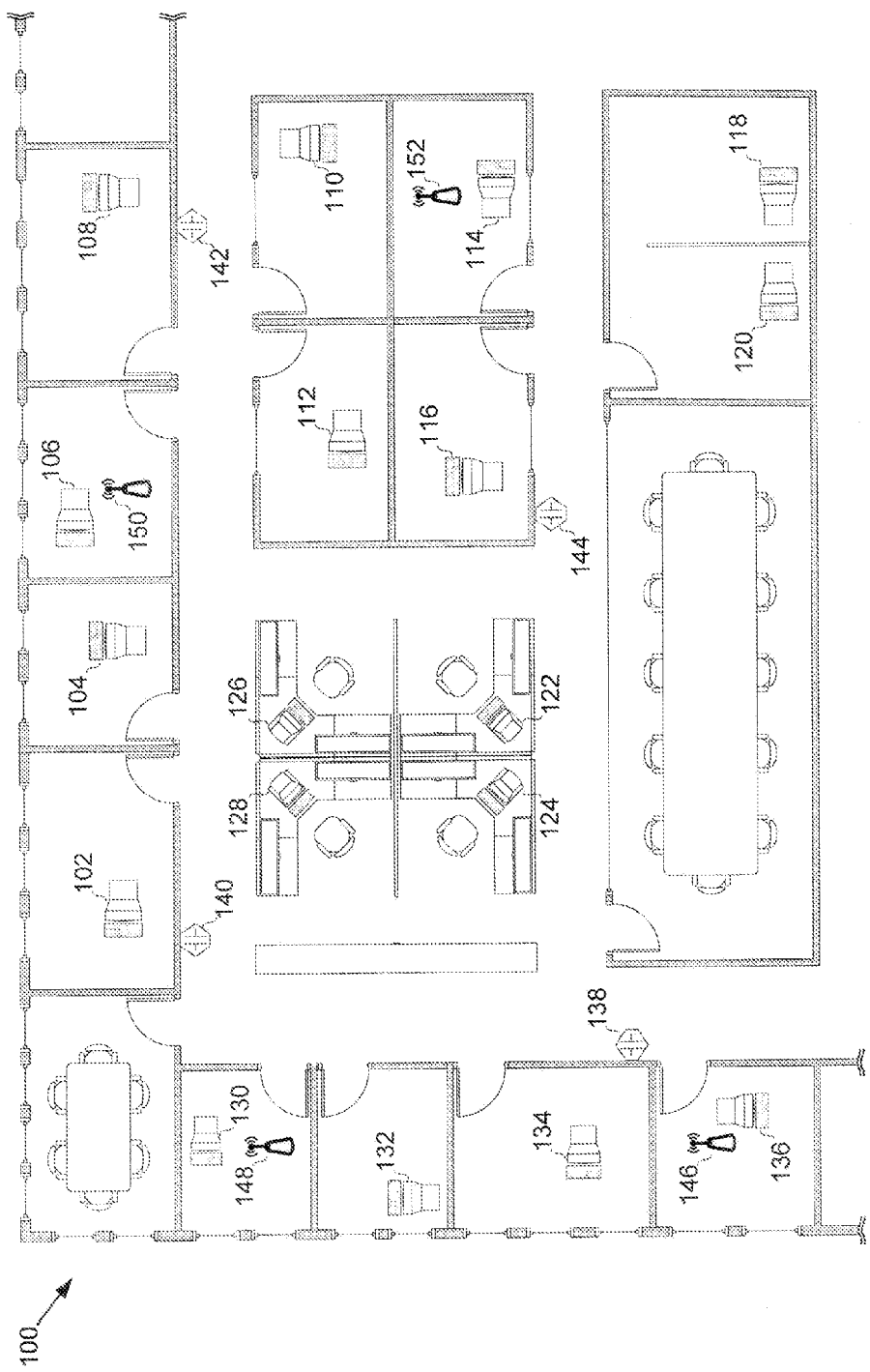
FIG. 1 shows a typical organizational computing environment.

Although the description thus far with reference to FIG. 2 has primarily focused on collecting information about a single detected wireless access point, the local computing endpoint 202, using its wireless interface 204 and local security agent 206, is capable of simultaneously detecting and monitoring multiple wireless access points. Thus, the fingerprint logging module 210 may collect and maintain profile information for more than one detected wireless access point during some time period. For example, referring to FIG. 1, should local computing endpoint 102 be provided with the wireless interface 204 and the local security agent 206, the associated fingerprint logging module 210 may collect information about wireless access points 148, 150 (noting that at the time of information collection, these wireless access points may not yet be determined as being rogue).

Still referring to FIG. 2, the local computing endpoint 202 is shown as being operatively connected to a centralized security agent 212. The connection may be wired or wireless. Moreover, the centralized security agent 212 may be maintained on a centralized computing endpoint (e.g., a server system) (not shown) administered by the organization. In one or more other embodiments, the centralized security agent 212 may be maintained on another local computing endpoint (not shown). Further, in one or more embodiments, the centralized security agent 212 may be part of software (e.g., Symantec Enterprise Console by Symantec Corporation) used by the organization to maintain security across its network.

In general, when the local computing endpoint 202 is connected to the centralized security agent 212, an update or synchronization routine may occur. For example, such a routine may occur when an individual first docks and/or powers up his/her notebook computer after a period of being off-line or otherwise disconnected from the organization's network. The synchronization routine may involve scanning the local computing endpoint 202 for malware, pushing out to the local computing endpoint 202 software updates and patches (e.g., an update containing all or part of the functionality of wireless access point detection module 208 and fingerprint logging module 210), and connecting the local computing endpoint 202 to certain resources on the organization's network.

The centralized security agent 212 is shown in FIG. 2 as having a plurality of different modules. As described above, a "module" is any logic, functionality, and/or program implemented in hardware and/or software. The centralized security agent 212 has an aggregator module 214. As the local computing endpoint 202 and other local computing endpoints (not shown) connect to and synchronize with the centralized security agent 212, the aggregator module 214 collects detected wireless access point fingerprint logs from the local computing endpoints. This collection may occur either by a push protocol in which the local computing endpoints initiate the transfer of the fingerprint logs or a pull protocol in which the aggregator module 214 initiates an upload of the fingerprint logs.

Further, the centralized security agent 212 includes a localization module 216. In a collected fingerprint log for a particular detected wireless access point, there is recorded signal strength information that the localization module 216 can use to determine a distance range between the local computing endpoint 202 and the detected wireless access point. In addition, the fingerprint log specifies an IP address of the local computing endpoint 202 at the time the signal strength information was recorded. As this IP address specifies a location of the local computing endpoint 202, the localization module 216 may thus not only determine a distance between the local computing endpoint 202 and the detected wireless access point, but may also determine a finite range of possible locations of the detected wireless access point. Thus, the localization module 216 can effectively map out possible locations of the various wireless access points for which fingerprint logs have been collected.

Once the possible locations of detected wireless access points has been determined, the location module 216 may perform any one or more of various routines to determine possible locations at a degree of certainty higher than that which was determined previously using IP address and signal strength information. Particularly, for example, the localization module 216 may run a triangularization algorithm to determine a location of a detected wireless access point based on possible locations of other detected wireless access points.

Further, the localization module 216 may remove from a mapping of possible location those detected wireless access points determined as being redundantly represented. For example, now also referring to FIG. 1, the localization module 216 may determine that a set of possible locations of a wireless access point (here, wireless access point 152) detected by local computing endpoint 120 and a set of possible locations of a wireless access point (here, also wireless access point 152) detected by another local computing endpoint 118 actually represent a single wireless access point 152 as opposed to two separate wireless access points.

Still referring to FIG. 2, the centralized security agent 212 also has a correlation module 218. Based on the localization module's 216 mapping of possible locations of detected wireless access points as described above, the correlation module 218 can query the collected fingerprint logs to determine which ones of the detected wireless access points are actually sanctioned by the organization. For example, a source MAC address and/or SSID information can be used to determine whether a detected wireless access point actually belongs to the organization. Further, as described above, a collected fingerprint log may indicate abnormal wireless activity patterns. This information may indicate that the corresponding detected wireless access point does not belong to the organization, or in the least, warrants particular attention. Further, for example, the correlation module 218 may use the location information determined by the localization module 216 to determine that certain ones of the detected wireless access points are at locations known to have sanctioned wireless access points. For those detected wireless access points determined as not or likely not belonging to the organization, the correlation module 218 may mark them as being rogue wireless access points.

It is noted that in one or more embodiments, the correlation module 218 may process the collected fingerprint logs prior to the localization module 216. In such a case, the correlation module 218 may first remove from further processing those fingerprint logs associated with sanctioned wireless access points. For example, if a fingerprint log indicates a detected wireless access point as having a sanctioned MAC address and adhering to particular security policies, then that wireless access point is determined as belonging to the organization, and thus, as not being rogue. The fingerprint logs for those detected wireless access points for which a dispositive determination cannot be made may then be processed by the localization module 216 as described above.

Additionally, the centralized security agent 212 includes a reporting/dispatch module 220. Once a set of likely rogue wireless access points has been determined using the above described functionalities of the localization module 216 and/or the correlation module 218, the reporting/dispatch module 220 provides an administrator or other user a listing or mapping of the likely rogue wireless access points. The reported information may include, for example, likely locations and makes and models of the rogue wireless access points. The administrator can then direct personnel to those likely locations to inspect or selectively remove the rogue wireless access points. Alternatively, for example, the information reported to the administrator by the reporting/dispatch module 220 may include profile information describing wireless activity patterns of particular rogue wireless access points. The administrator may in turn determine that one or more of these rogue wireless access points do not pose a threat and mark them as not requiring additional attention.

Figure 3:
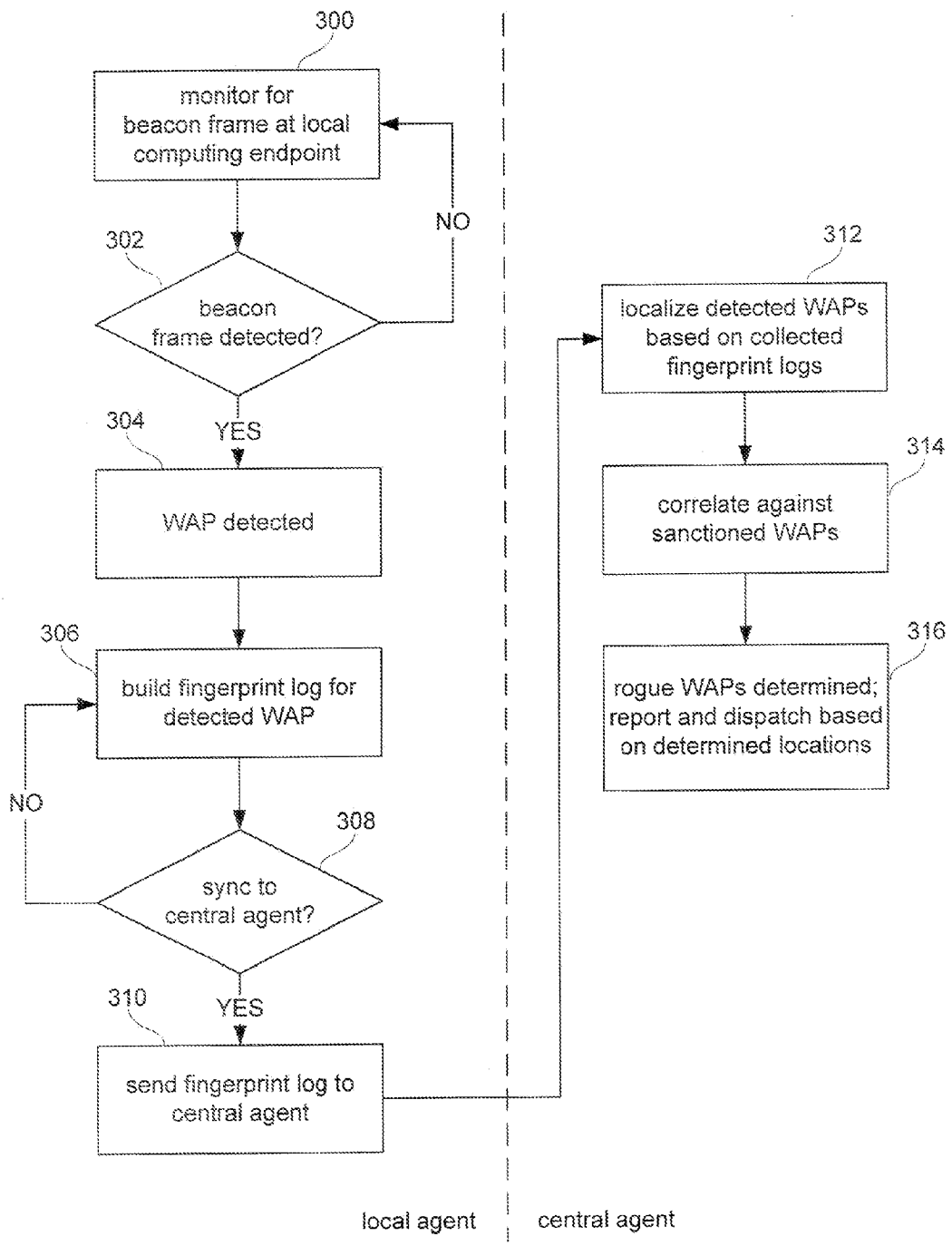
FIG. 3 shows a flow process in accordance with an embodiment of the present invention.

FIG. 3 shows a flow process in accordance with an embodiment of the present invention. The process continuously monitors for beacon frames received at a particular local computing endpoint 300. As described above, beacon frames are broadcasted by a wireless access point to announce its presence and relay other information regarding, for example, a communication protocol supported or used by the wireless access point. Thus, if a beacon frame is detected 302, the associated wireless access point is effectively detected 304.

For a detected wireless access point, the process builds a fingerprint log 306. As described above, the fingerprint log may be built by recording information regarding, for example, the wireless access point's make and model, data transmission and reception behavior, signal strength, operation times, and SSID.

When the local computing endpoint is synchronized to a central agent 308, the fingerprint log for the detected wireless access point is sent to the central agent 310. It is noted that the local computing endpoint may send multiple fingerprint logs to the central agent if it has detected and tracked multiple wireless access points since a last synchronization. These fingerprint logs may be batched in a file of the local computing endpoint. When the local computing endpoint is next synchronized with the central agent, the batch file may be transmitted to the central agent. In one or more other embodiments, fingerprint logs may be sent in real-time as they are built. In still one or more other embodiments, fingerprint logs may be sent to the central agent periodically or regularly (e.g., every hour the local computing endpoint is connected to the central agent).

At the central agent, the various detected wireless access points indicated by a collection of multiple fingerprint logs received by the central agent are localized 312. In other words, the process determines possible locations of the detected wireless access points using the fingerprint logs collected from multiple local computing endpoints.

Additionally, the fingerprint logs collected at the central agent are correlated against information about sanctioned wireless access points 314. In other words, the various wireless access points represented by the collected fingerprint logs are filtered against known wireless access points. Accordingly, the wireless access points determined as not being sanctioned are deemed as being rogue wireless access points 316. This listing of likely rogue wireless access points is reported to an administrator and may be used by the administrator to dispatch personnel to those locations determined as being likely locations of the rogue wireless access points.

Figure 4:
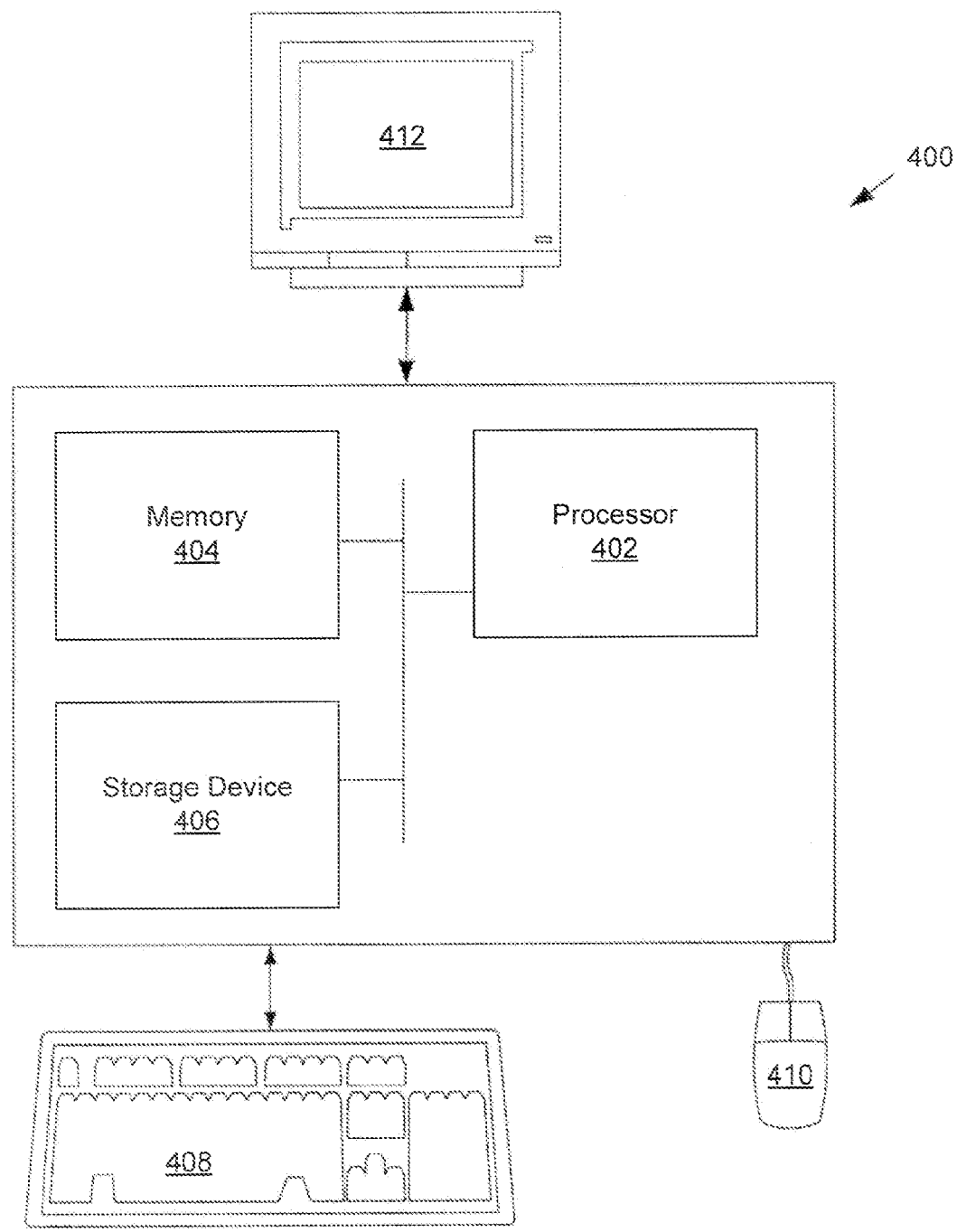
FIG. 4 shows a computer system in accordance with an embodiment of the present invention.

Further, one or more embodiments of the present invention may be associated with virtually any type of computer system, including multiprocessor and multithreaded uniprocessor systems, regardless of the platform being used. For example, as shown in FIG. 4, a networked computer system 400 includes at least one processor (e.g., a general-purpose processor, a field-programmable gate array (FPGA), an application-specific integrated circuit (ASIC), a graphics processor) 402, associated memory 404, a storage device (e.g., a hard drive) 406, and numerous other elements (not shown) and functionalities typical of modern computer systems. The networked computer system 400 may also include input means (e.g., a keyboard 408, a mouse 410) and output means (e.g., a monitor 412). The networked computer system 400 may be connected to a LAN or a WAN via a network interface connection (e.g., wireless interface 204 shown and described above with reference to FIG. 2). Those skilled in the art will appreciate that these input and output means may take other forms. Further, those skilled in the art will appreciate that one or more elements of the networked computer system 400 may be remotely located and connected to the other elements over a network. Further, software instructions to perform one or more embodiments of the present invention may be stored on a computer-readable medium such as a compact disc (CD), a digital video disc (DVD), a diskette, a tape, a file, a USB drive, or any other computer-readable storage device.

While the invention has been described with respect to a limited number of embodiments, those skilled in the art, having benefit of the above description, will appreciate that other embodiments may be devised which do not depart from the scope of the present invention as described herein. Accordingly, the scope of the present invention should be limited only by the appended claims.

What is claimed is:

1. A computer-implemented method of detecting a security threat in an organization, comprising:

detecting a plurality of wireless access points with wireless interfaces of a plurality of local computing endpoints of the organization, wherein the wireless access points allow computing devices to access one or more networks;

building fingerprint logs to detect abnormal wireless activity by the plurality of detected wireless access points;

determining whether the fingerprint logs indicate abnormal wireless activity by the wireless access points;

responsive to a fingerprint log for a detected wireless access point indicating abnormal wireless activity by the wireless access point, monitoring the wireless access point to detect data patterns associated with the abnormal wireless activity;

determining, based at least in part on the detected data patterns, whether the wireless access point is a rogue wireless access point not sanctioned by the organization; and removing wireless access points being redundantly represented from a mapping of possible locations, wherein the redundancy is caused by detection of a set of possible locations of a single wireless access point by two or more of the plurality of local computing endpoints.

2. The computer-implemented method of claim 1, wherein a wireless interface is at least one of a wireless adapter, a wireless card, and a wireless dongle.

3. The computer-implemented method of claim 1, wherein a local computing endpoint is at least one of a desktop computer, a notebook computer, and a handheld computer.

4. The computer-implemented method of claim 1, wherein the fingerprint log for the wireless access point records information comprising at least one of a signal strength of the wireless access point, a MAC address of the wireless access point, an SSID of the wireless access point, an operation time of the wireless access point, a communication protocol supported by the wireless access point, a make of the wireless access point, a model of the wireless access point, a data transmission pattern of the wireless access point, a data access pattern of the wireless access point, a data request pattern of the wireless access point, and information contained in a beacon frame broadcast by the wireless access point.

5. The computer-implemented method of claim 1, further comprising:

recording IP addresses of the local computing endpoints in the fingerprint logs.

6. A system for detecting a security threat in an organization, comprising:

a centralized computing endpoint operatively connected to a plurality of local computing endpoints of the organization, ones of the local computing endpoints having a wireless interface, the wireless interface enabled to detect a plurality of wireless access points allowing computing devices to access one or more networks, the plurality of local computing endpoints enabled to build fingerprint logs to detect abnormal wireless activity by the plurality of detected wireless access points, the local computing endpoints further enabled to determine whether the fingerprint logs indicate abnormal wireless activity by the wireless access points and, responsive to a fingerprint log for a detected wireless access point indicating abnormal wireless activity by the wireless access point, monitor the wireless access point to detect data patterns associated with the detected abnormal activity;

the centralized computing endpoint being arranged to:

determine whether the wireless access point is a rogue wireless access point not sanctioned by the organization based at least in part on the detected data patterns; and remove wireless access points being redundantly represented from a mapping of possible locations, wherein the redundancy is caused by detection of a set of possible locations of a single wireless access point by two or more of the plurality of local computing endpoints.

7. The system of claim 6, wherein a local computing endpoint is at least one of a desktop computer, a notebook computer, and a handheld computer.

8. The system of claim 6, wherein the wireless interface is at least one of a wireless card, a wireless adapter, and a wireless dongle.

9. The system of claim 6, wherein a local computing endpoint is operatively connected to the centralized computing endpoint via at least one of a wired connection and a wireless connection.

10. The system of claim 6, wherein a local computing endpoint comprises:

a wireless access point detection module arranged to detect the wireless access point in response to receiving a beacon frame broadcast by the wireless access point.

11. The system of claim 10, wherein the local computing endpoint comprises:

a fingerprint logging module arranged to record information about the wireless access point while the wireless access point continues to be detected by the wireless access point detection module.

12. The system of claim 11, wherein the information recorded by the fingerprint logging module comprises at least one of a signal strength of the wireless access point, a MAC address of the wireless access point, an SSID of the wireless access point, an operation time of the wireless access point, a communication protocol supported by the wireless access point, a make of the wireless access point, a model of the wireless access point, a data transmission pattern of the wireless access point, a data access pattern of the wireless access point, a data request pattern of the wireless access point, and information contained in a beacon frame broadcast by the wireless access point.

13. The system of claim 6, wherein the centralized computing endpoint comprises:

an aggregator module arranged to collect fingerprint logs from the plurality of local computing endpoints; and a localization module arranged to determine the locations of the detected plurality of wireless access points using the collected fingerprint logs.

14. The system of claim 13, wherein the centralized computing endpoint further comprises:

a reporting module arranged to generate a report describing the locations of the wireless access points to an administrator of the organization.

15. A computer-readable medium having instructions stored therein that are executable by a processor for detecting a security threat in an organization, the instructions comprising instructions to:

detect a plurality of wireless access points with wireless interfaces of a plurality of local computing endpoints of the organization, wherein the wireless access points allow computing devices to access one or more networks;

build fingerprint logs to detect abnormal wireless activity by the plurality of detected wireless access points;

determine whether the fingerprint logs indicate abnormal wireless activity by the wireless access points;

responsive to a fingerprint log for a detected wireless access point indicating abnormal wireless activity by the wireless access point, monitor the wireless access point to detect data patterns associated with the abnormal wireless activity; and transmit the fingerprint log to a centralized computing endpoint, wherein the fingerprint log is used by the centralized computing endpoint to determine whether the wireless access point is a rogue wireless access point not sanctioned by the organization and to remove wireless access points being redundantly represented from a mapping of possible locations, wherein the redundancy is caused by detection of a set of possible locations of a single wireless access point by two or more of the plurality of local computing endpoints.

16. The computer-readable medium of claim 15, wherein a local computing endpoint is at least one of a desktop computer, a notebook computer, and a handheld computer.

17. The computer-readable medium of claim 15, wherein the fingerprint log for the wireless access point records information comprising at least one of a signal strength of the wireless access point, a MAC address of the wireless access point, an SSID of the wireless access point, an operation time of the wireless access point, a communication protocol supported by the wireless access point, a make of the wireless access point, a model of the wireless access point, a data transmission pattern of the wireless access point, a data access pattern of the wireless access point, a data request pattern of the wireless access point, and information contained in a beacon frame broadcast by the wireless access point.

18. The computer-implemented method of claim 1, further comprising:
  detecting abnormal wireless activity by the wireless access points by discerning the wireless activity by the access points from normal wireless activity for the organization.

19. The computer-implemented method of claim 1, wherein the monitoring monitors for a data pattern comprising at least one of an abnormal data transmission pattern, an abnormal data access pattern, and an abnormal data request pattern.

20. The computer-implemented method of claim 1, wherein the abnormal wireless activity comprises at least one of a continuous demand for large amounts of data and repeated attempts to deliver same data.

21. The computer-implemented method of claim 1, further comprising:
  generating a report describing a location of a determined rogue wireless access point to an administrator of the organization.

22. The computer-implemented method of claim 1, further comprising:
  determining the locations of the detected wireless access points using the fingerprint logs built by the plurality of local computing endpoints.

23. The computer-implemented method of claim 1, wherein building fingerprint logs comprises directly connecting to the plurality of wireless access points to collect information not broadcasted by the wireless access points.

24. The computer-implemented method of claim 1, wherein determining whether the wireless access point is a rogue wireless access point comprises analyzing the fingerprint logs to identify wireless access points sanctioned by the organization.

* * * * *